Patented Sept. 12, 1944

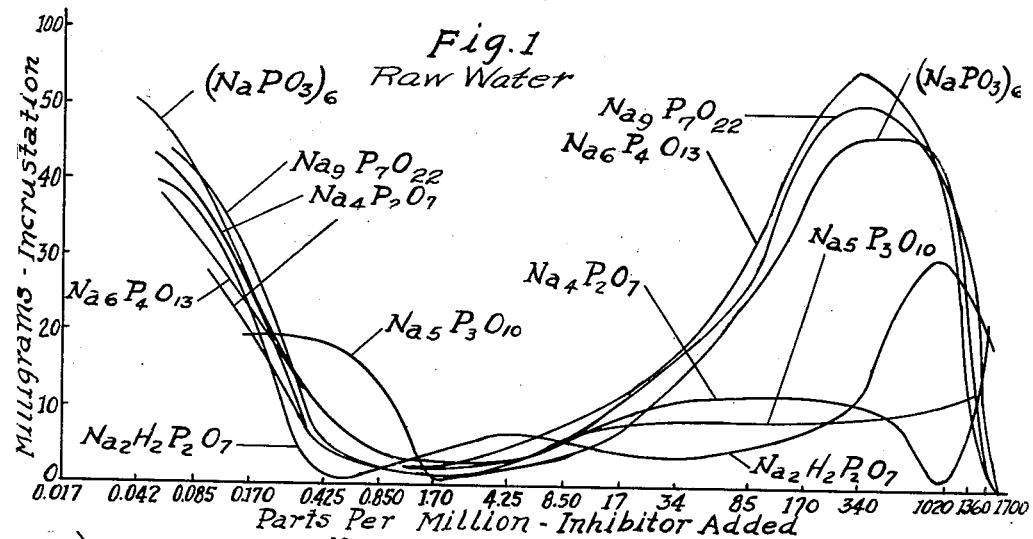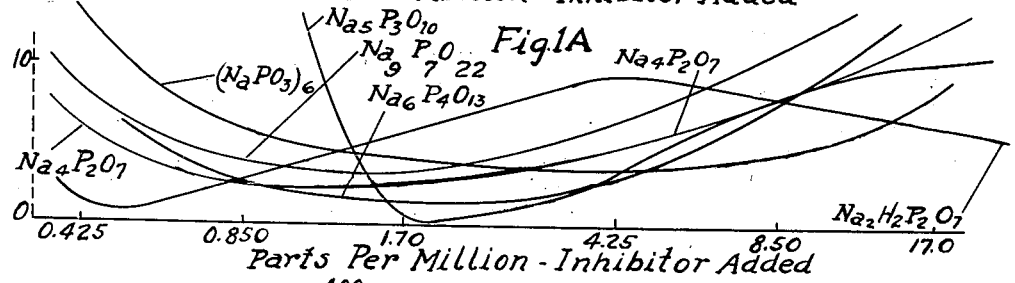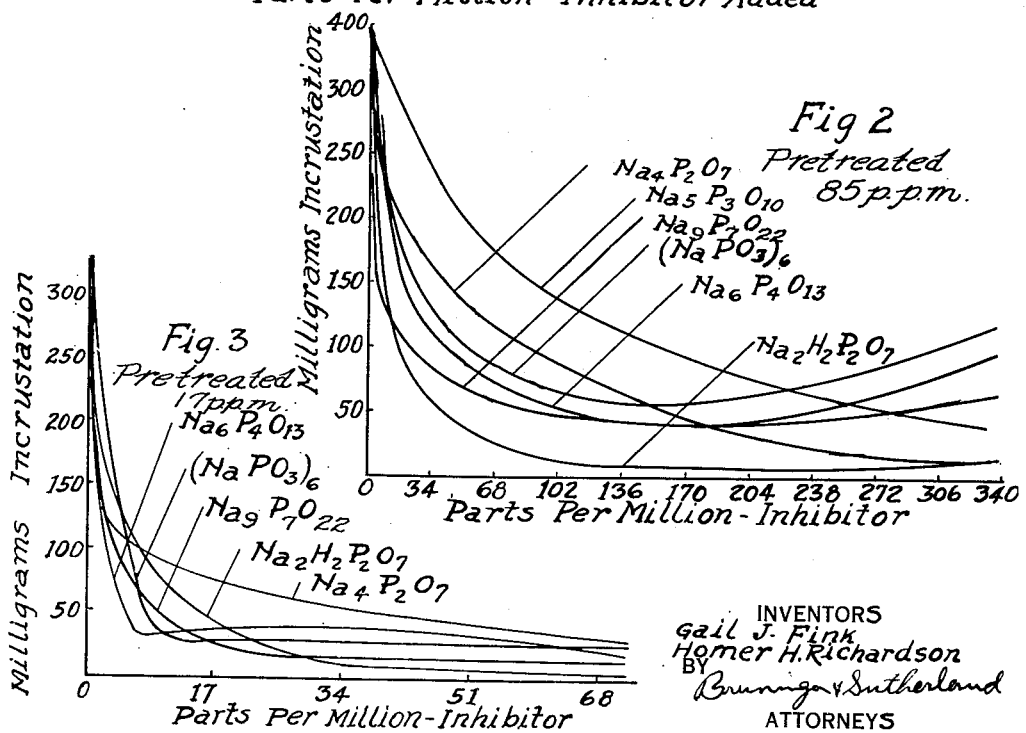

2,358,222

UNITED STATES PATENT OFFICE 2,358,222

ART OF TREATING WATER FOR INDUSTRIAL CONSUMPTION

Gail J. Fink, La Grange, and Homer H. Richardson, Western Springs, Ill., assignors to National Aluminate Corporation, Chicago, Ill., a corporation of Delaware Application May 11, 1940, Serial No. 334,622

19 Claims. (Cl. 210—23)

This invention relates to the art of treating water for industrial consumption. This application is a continuation in part of application, Serial No. 92,602, filed July 25, 1936.

The following definitions are given to facilitate the disclosure: Total alkalinity of a water for industrial consumption is determined by titrating the water with a standard acid in the presence of a methyl-orange indicator, the results being recorded as parts per million as calcium carbonate ($CaCO_3$). Soap hardness of such a water is determined by titrating the water with a standard soap solution until a permanent lather is formed; the results are recorded as parts per million in terms of calcium carbonate. Temporary hardness is that hardness of the water which is due to those calcium and magnesium salts which come out of the solution upon boiling of the water. Permanent hardness is the hardness remaining in the water after it has been boiled. Chemically stated, temporary hardness is considered to consist of the carbonates and bicarbonates of calcium and magnesium; permanent hardness is considered to be that hardness due to chlorides and sulfates of calcium and magnesium. The pretreatment of such a water with softening chemicals increases the total alkalinity of the water with respect to the soap hardness; for while, in some instances, the alkalinity may go down upon such treatment, the soap hardness may go down even more, so that the ratio of total alkalinity to soap hardness may increase and generally exceeds 1. The conversion factor of grains per gallon to parts per million is 17.1.

In the art of treating water for industrial consumption, as where water is used in boilers, condensers, coolers and for the supply of municipalities, while the water contains alkaline earth compounds and may be alkaline, the total alkalinity of the water as obtained or used, generally does not exceed the soap hardness, by more than one hundred parts per million, and is ordinarily less than eighty-five parts per million, expressed as $CaCO_3$. In the supply of municipal or potable water, the presence of ammonia should be avoided because it is an indication of sewage pollution, while in boiler feed water ammonia should be avoided because of its corrosive effect. For industrial consumption, the water is frequently heated, particularly for use in boilers, while it also may be heated when used in condensers, heat exchangers generally, coolers, and even in water heaters utilized for various purposes.

Water for industrial consumption must be, and is intended to be, conducted through passageways in order to permit its utilization. Where the raw or untreated water contains alkaline earth compounds, and particularly where it is alkaline, difficulty is encounted in that deposits will be formed in the passageways which interfere with the efficient supply and use of the water. Even where the raw water has been treated to reduce the hardness, as by a chemical softening agent such as soda ash, the treated water will still contain sufficient alkaline earth salts in suspension or in solution to result in deposition in the passageways; this is true even if time is allowed for settling before the water is delivered for consumption, although such time is not permitted in many cases. Moreover, the softening process seldom goes to completion, leaving a residual hardness.

In the treatment of water for industrial consumption, the problem of deposit in passageways is of particular moment because such water is heated for various purposes, resulting in aggravation of the deposits in the passageways.

It has been proposed to treat for industrial consumption water, whether raw or pre-treated, to effect solution of the alkaline earth compounds. One such procedure involved the treatment of the water with sodium-hexa-metaphosphate for the purpose of sequestering the alkaline earth salts. This process, however, required the use of excessively large quantities of the reagent, making the process a costly one; it moreover, has additional limitations.

One of the objects of this invention, therefore, is to provide a process of treating water for industrial consumption in which the treating agent is so chosen and employed in such a zone of concentration and within such ranges, as hereinafter defined, as to require a very small amount of the reagent and have no harmful effects.

Further objects will appear from the detailed description taken in connection with the accompanying drawing, in which:

Figure 1 is a graph showing the results of treatment of raw or untreated water with a number of reagents within such ranges and in such zones illustrating, for comparison, a number of embodiments of this invention;

Figure 1A is an enlargement of the middle part of Figure 1.

Figure 2 is a similar graph showing the results of treatment of the water which has been chemically pre-treated to result in an alkalinity in excess of the hardness of five grains per gallon (about eighty five parts per million) expressed as $CaCO_3$;

Figure 3 is a similar graph in which the excess alkalinity by pre-treatment is one grain per gallon (about seventeen parts per million), expressed as $CaCO_3$.

The drawing and the specification illustrate and describe embodiments of this invention and application Serial No. 92,602 illustrates and describes additional embodiments; it will be understood, however, that this invention is susceptible of various embodiments within the scope of the appended claims. In the disclosure expositions will be given of probable or possible theories; this has, however, only been done for the purpose of facilitating the explanation of the principle of this invention, since this invention is not dependent upon any specific theory.

The reagents which are particularly suitable for the treatment of water for industrial consumption comprise the various polyphosphoric acid compounds, particularly those which are soluble in water and still more particularly the alkali polyphosphates; these polyphosphoric acid compounds include the pyrophosphates, the metaphosphates and complex phosphates.

The polyphosphates, such as the pyrophosphates ($Na_4P_2O_7$ and $Na_2H_2P_2O_7$), the triphosphate ($Na_5P_3O_{10}$), the tetraphosphate ($Na_6P_4O_{13}$), the hexametaphosphate ($NaPO_3$)$_6$, and the complex phosphate ($Na_9P_7O_{22}$), are genetically derived by molecular dehydration of orthophosphoric acid compounds, and are therefore sometimes called "molecularly dehydrated phosphates." Of these polyphosphates, the polymetaphosphates are glassy and are therefore sometimes called "phosphate glasses." The exact compositions of some of these phosphates have not been definitely established, as to whether they are true compounds or mixtures; that particularly applies to the tetraphosphate and the complex phosphate noted above; it will, therefore, be understood that the designation "polyphosphoric acid compound" is used descriptively and not limitatively. Furthermore some of these polyphosphates are more soluble than others; accordingly, the designation "water soluble" is used descriptively and not limitatively.

A series of these polyphosphates and their actions are given on Figure 1, in which the notations express the probable structures of the complex phosphates. It will be noted that the polyphosphates are much more efficient in their action than are the orthophosphates and this difference in efficiency is not simply one in degree, but in kind. These polyphosphates may be employed alone or with a protective compound, including the tannins, gelatin, starch, lignic which is a soluble lignin derivative; the latter and tannin are organic dispersive agents which probably have dispersive effects upon calcium orthophosphate, and related materials; and it is found that the efficiency of the combination is increased not simply by the additive effects of the two, but by their combined action, resulting in a difference in kind and not in degree.

In accordance with this invention, these polyphosphates are not employed in quantities sufficient to secure sequestering of the alkaline earth salts, but in very much smaller quantities. As shown, particularly in Figure 1, the amount of the reagent added to the water falls within the ranges wherein deposition of the alkaline earth compound is suppressed and wherein the soap hardness of the water is substantially unaffected by the inhibiting compound.

Generally stated, the inhibiting compound is used in an amount not exceeding one hundred parts of the compound per million parts of the water. In an untreated water (a water to which no softening agent has been added, but which may have been chlorinated or clarified, such as exemplified in Fig. 1) the inhibiting compound is used in an amount from one tenth to seventeen parts per million. Ordinarily, untreated water can be satisfactorily treated with an inhibitor used in a concentration from one to two parts per million. Where the water has a range of total hardness (total of calcium and magnesium salts), of one to one thousand parts per million, expressed as $CaCO_3$, the inhibitor compound may have a range of from one tenth to seventeen parts per million.

Generally stated, a water which has been treated with a chemical water softener requires more inhibiting compound in order to efficiently inhibit deposition of the alkaline earth compounds in the passageways for the water, and the amount required increases with the excess alkalinity over the soap hardness, as shown in Figures 2 and 3. The amount of the inhibiting compound required also increases with the hardness of the water, as will be shown later. The amounts of compounds required for varying conditions will be tabulated later. The amount of the phosphoric acid compound will generally be from one tenth to one hundred parts per million and not exceeding thirty five per cent of the soap hardness of the water; where the phosphoric acid compound is used in connection with a protective compound, then the amount of the phosphoric acid compound required will generally be less.

The inhibiting compound may be added to raw or untreated water in any suitable manner, as by injection into the supply line or to the tank or reservoir. Where the water is pre-treated, as with a softening compound, such as lime and soda ash, the inhibitor may be added before or after such treatment, or with the treating compound. Where a softener or storage tank is employed, the inhibiting compound is preferably added at the outlet of the storage tank after separation of the sludge. Where the water is pre-heated, as where it is used in boilers, the inhibiting compound is preferably added at the entrance to the heater. In general, where the water is treated with a chemical softener, it is preferable to add the inhibitor either with the chemical or at the outlet of the softening apparatus.

Figure 1 is a graph showing the result of treatment of untreated water with reagents embodying this invention. This chart is drawn on a logarithmic scale in order to reduce its length. The water was passed through a coil of uniform diameter at the flow rate of about one gallon per hour, and the temperature of the bath was 114° C., while the temperature of the water at the effluent of the coil was 200° F. (93.3° C.). The deposited incrustation was measured in milligrams, and the amount of inhibitor added is given in parts per million. The water had a hardness of twenty-eight grains per gallon (476 parts per million), and an alkalinity of twenty grains per gallon (340 parts per million) expressed as $CaCO_3$.

Figure 1 shows the striking effect of adding small amounts of the inhibiting compounds. The incrustation decreases very rapidly to an average minimum at about 0.1 grain per gallon, or 1.7 parts per million of the inhibitor and there is a rather wide band or zone where the amount of inhibitor required to suppress incrustation satisfactorily is from one tenth to thirty-four parts per million. Thereafter, the incrustation increases to a maximum at about three hundred and forty parts per million; thereafter the incrustation drops so that at about seventeen hundred parts per million, there is again a minimum incrustation. Much beyond this is the point where, for instance, for sodium hexa metaphosphate, there is a complete sequestering of the calcium and magnesium salts, as measured by the soap hardness with this particular water.

It will be seen that, within the first zone shown in Figure 1, the amount of the inhibiting compound required, is very small; it falls within the ranges wherein deposition of the alkaline earth compound is suppressed and wherein the soap hardness of the water is substantially unaffected by the inhibiting compound.

Figure 2 is a graph corresponding to Figure 1, but in which the same water was treated with soda ash to an excess of five grains per gallon (eighty five parts per million) of total alkalinity over soap hardness. It will be seen that again there is a rapid decrease in incrustation with the additive small amounts of the inhibiting compounds, and although the amount required to secure a minimum is above that required for the untreated water, it again falls within the ranges wherein deposition of the alkaline earth compound is suppressed and wherein the soap hardness of the water is substantially unaffected by the inhibiting compound.

This Figure 2 is on a lineal and not on a logarithmic scale and is considerably enlarged with reference to Figure 1 so that the upper right hump in Figure 1 is not shown, although it shows a distinct valley. Here, the polyphosphates are particularly much more efficient than are the orthophosphates.

Figure 3 shows the effect of treating the water of Figure 1 with soda ash to seventeen parts per million excess. This figure corresponds more generally with Figure 1 because of the small amount of excess of total alkalinity over the soap hardness. This figure, however, as well as the other figures, shows the parallel action of polyphosphates, showing that they differ relatively more in degree than in kind; although as noted above all of the polyphosphates differ in kind from the orthophosphates in their action on the water.

It may be here stated that the raw water used in obtaining the data of Figures 1, 2, and 3, had a total hardness of twenty-eight grains per gallon, a calcium hardness of eighteen grains per gallon, a phenolphthalein alkalinity of 0.0, and a methyl orange alkalinity of 20.0, all in grains per gallon, expressed as $CaCO_3$.

The following table shows the practical range of the amounts of phosphates to add for optimum inhibition of incrustation on various waters chemically treated and carrying up to eighty-five parts per million of methyl orange alkalinity in excess of the soap hardness both calculated as calcium carbonate:

| Polyphosphate | Hardness of water in P. P. M. | Range of recommended dosage in P. P. M. |
|---|---|---|
| Sodium hexametaphosphate $(NaPO_3)_6$ | 0–275 | 0.1 to 8 |
|  | 275–350 | 8 to 100 |
|  | 350 or over | 17 to 100 |
| Complex phosphate $(Na_8P_7O_{22})$ | 0–275 | 0.1 to 8 |
|  | 275–350 | 8 to 100 |
|  | 350 or over | 17 to 100 |
| Tetra sodium pyrophosphate $(Na_4P_2O_7)$ | 0–275 | 0.1 to 68 |
|  | 275–350 | 8 to 100 |
|  | 350 or over | 34 to 100 |
| Disodium pyrophosphate $(Na_2H_2P_2O_7)$ | 0–275 | 0.1 to 68 |
|  | 275–350 | 8 to 68 |
|  | 350 or over | 34 to 68 |
| Sodium tetraphosphate $(Na_6P_4O_{13})$ | 0–275 | 0.1 to 8 |
|  | 275–350 | 8 to 17 |
|  | 350 or over | 17 to 68 |

The following shows the results of inhibiting treatment with a composition comprising a polyphosphate and a protective compound. The water was that of Figures 1, 2 and 3, treated with sodium aluminate, caustic solution and soda ash in equal parts to give eighty-five parts per million alkalinity in excess of soap hardness, followed by treatment with the inhibitor composition. The time of reaction was one hour, and the water was decanted, after which time the inhibitor was added.

| Composition | Incrustation | |
|---|---|---|
|  | With tannin | Tannin omitted |
| 12 P. P. M. with sodium hexametaphosphate | 1.0 | 12.0 |
| 12 P. P. M. with $Na_4P_2O_7$ | 3.0 | 10.0 |
| 12 P. P. M. with complex $Na_8P_7O_{22}$ | 2.0 | 13.0 |
| 12 P. P. M. with sodium tetraphosphate, $Na_6P_4O_{13}$ | | |
| 24 P. P. M. sodium hexametaphosphate | 5.0 | 12.0 |
| 24 P. P. M. complex $Na_8P_7O_{22}$ | 3.0 | |
|  | 4.0 | |

In the above the composition at the left was one containing about 10% phosphate and 90% chestnut tannin. The second column shows the incrustation in milligrams with the composition at the rate of 12 to 24 parts per million. The third column shows the incrustation with one tenth of the amount of the composition, as the tannin was omitted, but the amount of phosphate was the same as that used in the second column, i. e., 1.2 to 2.4 parts per million.

From the above, it will be seen that the tannin decreases to a great extent the amount of incrustation and that the difference is not simply one of the additive effects; in other words, the difference is one in kind and not in degree but one of combined effect; in other words, the difference is one in kind and not in degree.

In accordance with embodiments of this invention heretofore described, there is prevented, precipitation of alkaline earth metal carbonate scale upon the heated surfaces of heating equipment through which is passed a stream of water containing enough carbonate hardness so that it would otherwise deposit such scale upon such surfaces as a result of heating the water which passes through the equipment; this is accomplished by adding to the water a water-soluble molecularly dehydrated phosphate which probably has a dispersive effect upon calcium carbonate. The amount of the phosphate added is much less than that required for softening the water but is sufficient to prevent the deposition of alkaline earth metal carbonate scale as the stream of water passes through the heating equipment. This amount added need not be more than about nine parts per million and may be in the order of about 1 to 3 parts per million of the water. The phosphate may be added alone or together with a protective compound or dispersive agent as heretofore described which has a dispersive effect upon calcium orthophosphate. The stream of water so treated and passed through the heating equipment is, therefore, stabilized so as to inhibit deposition. The treatment may be of raw water or of water which has been treated in a lime-soda-ash softener.

We claim:

1. In the art of treating water for industrial consumption, the process of inhibiting deposition of alkaline earth compounds in passageways for the water having a total alkalinity that does not exceed the soap hardness by more than one hundred parts per million, expressed as CaCO₃, comprising, adding to the water, a polyphosphoric acid compound in an amount not exceeding nine parts per million and not exceeding thirty five percent of the soap hardness of the water.

2. In the art of treating water for industrial consumption, the process of inhibiting deposition of alkaline earth compounds in passageways for the water having a total alkalinity that does not exceed the soap hardness by more than one hundred parts per million, expressed as CaCO₃, comprising, adding to the water, a polyphosphoric acid compound in an amount not exceeding one hundred parts per million and not exceeding thirty five per cent of the soap hardness of the water.

3. In the art of treating water for industrial consumption, the process of inhibiting deposition of alkaline earth compounds in passageways for the water having a total alkalinity that does not exceed the soap hardness by more than one hundred parts per million, expressed as CaCO₃ and having a range of total hardness from one part to one thousand parts per million, expressed as CaCO₃, comprising, adding to the water a polyphosphoric acid compound in an amount from one tenth to seventeen parts per million and not exceeding thirty five per cent of the soap hardness of the water.

4. In the art of treating water for industrial consumption, the process of inhibiting deposition of alkaline earth compounds in passageways for the water having a total alkalinity that does not exceed the soap hardness by more than one hundred parts per million, expressed as CaCO₃, comprising, adding to an untreated water a polyphosphoric acid compound in an amount from one tenth to seventeen parts per million and not exceeding thirty five per cent of the soap hardness of the water.

5. In the art of treating water for industrial consumption, the process of inhibiting deposition of alkaline earth compounds in passageways for the water having a total alkalinity that does not exceed the soap hardness by more than one hundred parts per million, expressed as CaCO₃, comprising, adding to a water, which has been treated by a softening agent, a polyphosphoric compound, in an amount from one tenth to one hundred parts per million and not exceeding thirty five per cent of the soap hardness of the water.

6. In the art of treating water for industrial consumption, the process of inhibiting deposition of alkaline earth compounds in passageways for the water having a total alkalinity that does not exceed the soap hardness by more than one hundred parts per million, expressed as CaCO₃, comprising, adding to the water an inhibiting polyphosphoric acid compound and a protective compound, with the phosphoric acid compound in an amount not exceeding one hundred parts per million and not exceeding thirty five per cent of the soap hardness of the water.

7. In the art of treating water for industrial consumption, the process of inhibiting deposition of alkaline earth compounds in passageways for the water having a total alkalinity that does not exceed the soap hardness by more than one hundred parts per million, expressed as CaCO₃, comprising, adding to the water an inhibiting polyphosphoric acid compound and a protective polyphosphoric acid compound, with the polyphosphoric acid compound in an amount from one tenth to one hundred parts per million and not exceeding thirty five per cent of the soap hardness of the water.

8. In the art of treating water for industrial consumption, the process comprising adding to the water, a water softening compound, and a polyphosphoric acid compound, with the polyphosphoric acid compound in an amount from one tenth to one hundred parts per million and not exceeding thirty five per cent of the soap hardness of the water.

9. In the art of treating water for industrial consumption, the process comprising adding to the water, a water softening compound, a protective compound, and a polyphosphoric acid compound, with the polyphosphoric acid compound in an amount from one tenth to one hundred parts per million and not exceeding thirty five per cent of the soap hardness of the water.

10. In the art of treating for industrial consumption, the process comprising, adding to the water, designed for movement through passageways and for the application of heat, a polyphosphoric acid compound in an amount not exceeding nine parts per million and not exceeding thirty five per cent of the soap hardness of the water.

11. In the art of treating water for industrial consumption, the process comprising, adding to the water, designed for movement through passageways and for the application of heat, a polyphosphoric acid compound in an amount from one tenth to one hundred parts per million and not exceeding thirty five per cent of the soap hardness of the water.

12. The herein described process of preventing the precipitation of alkaline-earth metal carbonate scale upon the heated surfaces of heating equipment through which is passed a stream of water containing enough carbonate hardness so that it would otherwise deposit such scale upon such surfaces, which comprises, adding to the water a water-soluble molecularly dehydrated phosphate which has a dispersive effect upon calcium carbonate in an amount much less than that required for softening the water and not more than about 9 parts per million but sufficient to prevent the deposition of alkaline-earth metal carbonate scale as the stream of water passes through the heating equipment, and thereafter passing a stream of the water so treated through a heating equipment in which the flowing stream of water is heated.

13. The herein described process of preventing the precipitation of calcium carbonate scale upon the heated surfaces of heating equipment through which is passed a stream of water containing enough carbonate hardness so that it would otherwise deposit such scale upon such surfaces, which comprises, adding to the water a water-soluble molecularly dehydrated phosphate which has a dispersive effect upon calcium carbonate in an amount of the order of about 1 to 3 parts per million, and thereafter passing a stream of the water so treated through a heating equipment in which the flowing stream of water is heated.

14. The herein described process of stabilizing against the deposition of alkaline-earth metal carbonate scale the water used as the cooling medium in a heat exchanging system which contains enough carbonate hardness so that upon heating it would otherwise deposit such scale upon the surfaces of the heat exchanging system, which comprises, adding to the water a water-soluble molecularly dehydrated phosphate which has a dispersive effect upon calcium carbonate in an amount much less than that required for softening the water and not more than about 9 parts per million but sufficient to prevent the deposition of alkaline-earth metal carbonate scale as the water passes through the heat exchanging equipment, and thereafter passing a stream of the water so stabilized through a heat exchanging system in which the flowing stream of water is heated.

15. The herein described process of treating and heating a water which would otherwise precipitate calcium carbonate upon heating, which comprises, adding to the water a water-soluble molecularly dehydrated phosphate which has a dispersive effect upon calcium carbonate in an amount much less than that required for softening the water and not more than about 9 parts per million but sufficient to prevent the precipitation of calcium carbonate as a result of heating the water together with an organic dispersive agent which has a dispersive effect upon calcium orthophosphate, and thereafter heating the water so treated.

16. The herein described process of treating and heating a water which would otherwise precipitate an alkaline-earth metal carbonate upon heating, which comprises, adding to the water a water-soluble molecularly dehydrated phosphate which has a dispersive effect upon calcium carbonate in an amount of the order of about 1 to 3 parts per million, and thereafter heating the water so treated.

17. The herein described process of preventing the deposition of calcium carbonate scale upon the heated surfaces of heating equipment through which is passed a stream of water which has been treated in a lime-soda-ash softener, which comprises, adding to the effluent water from the lime-soda-ash softener a molecularly dehydrated phosphate which has a dispersive effect upon calcium carbonate in an amount of the order of 1 to 3 parts per million, and thereafter heating the water so treated.

18. The process of treating water which consists in adding to the water sodium hexametaphosphate in an amount of the order of about 1 to 3 parts per million and not more than 9 parts per million.

19. The process of treating water which consists in adding to the water an alkali metal salt of a polyphosphoric acid in an amount of the order of about 1 to 3 parts per million and not more than 9 parts per million.

GAIL J. FINK.
HOMER H. RICHARDSON.

CERTIFICATE OF CORRECTION.

Patent No. 2,358,222.  September 12, 1944.

GAIL J. FINK, ET AL.

It is hereby certified that error appears in the printed specification of the above numbered patent requiring correction as follows: Page 3, second column, line 37, strike out the semicolon after "effects" and insert instead a comma; lines 37 and 38, strike out "in other words, the difference is one in kind and not in degree"; page 4, second column, line 19, claim 10, after "treating" insert --water--; and that the said Letters Patent should be read with this correction therein that the same may conform to the record of the case in the Patent Office.

Signed and sealed this 28th day of November, A. D. 1944.

Leslie Frazer (Seal)  Acting Commissioner of Patents.